United States Patent
Sanduja et al.

(10) Patent No.: US 7,309,745 B2
(45) Date of Patent: Dec. 18, 2007

(54) COATING MATERIAL FOR A GRAFTED IGNITION WIRE

(75) Inventors: Mohan L. Sanduja, Flushing, NY (US); Paul Thottathil, New Hyde Park, NY (US); Lina Zilberman, Brooklyn, NY (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 239 days.

(21) Appl. No.: 11/174,826

(22) Filed: Jul. 5, 2005

(65) Prior Publication Data

US 2006/0004170 A1 Jan. 5, 2006

Related U.S. Application Data

(60) Provisional application No. 60/585,143, filed on Jul. 2, 2004.

(51) Int. Cl.
*C08L 83/04* (2006.01)

(52) U.S. Cl. .................. 525/477; 106/287.16; 524/261; 524/267; 528/24; 528/34; 528/43

(58) Field of Classification Search .................... None
See application file for complete search history.

(56) References Cited

U.S. PATENT DOCUMENTS

| | | | |
|---|---|---|---|
| 3,695,922 A | 10/1972 | Sattler | 117/218 |
| 3,698,931 A | 10/1972 | Horowitz | 117/47 |
| 4,000,362 A | 12/1976 | Kawaguchi et al. | 174/120 |
| 4,435,692 A | 3/1984 | Miyamoto et al. | 338/214 |
| 4,564,562 A | 1/1986 | Wong | 428/447 |
| 4,629,285 A | 12/1986 | Carter et al. | 350/96.23 |
| 4,700,171 A | 10/1987 | Coffey et al. | 338/214 |
| 4,966,922 A * | 10/1990 | Gross et al. | 522/25 |
| 6,040,378 A | 3/2000 | Sanduja et al. | 524/588 |
| 6,630,244 B1 * | 10/2003 | Mao et al. | 428/447 |
| 2003/0129546 A1 | 7/2003 | Mitsui et al. | 430/320 |

* cited by examiner

*Primary Examiner*—Marc S. Zimmer
(74) *Attorney, Agent, or Firm*—Dickinson Wright PLLC; Edmund P. Anderson

(57) ABSTRACT

A silicone coating material is operative to graft a silicone polymer coating on an ignition wire. The ignition wire includes an insulated conductor with an inner conductive core and an outer insulating jacket layer which has an outer surface. The silicone coating material is applied to the outer surface of the insulating jacket layer and includes a silicone prepolymer, a coupling agent, a catalyst, and a graft initiator. The graft initiator is operative to prepare the outer surface of the insulating jacket to receive by grafting the coating layer including the silicone prepolymer and the coupling agent, and the catalyst is operative to promote grafting by polymerization of the coating layer.

10 Claims, 1 Drawing Sheet

COATING MATERIAL FOR A GRAFTED IGNITION WIRE

CROSS-REFERENCES TO RELATED APPLICATIONS

This patent application claims priority to U.S. Provisional Patent Application Ser. No. 60/585,143, filed Jul. 2, 2004, which is hereby incorporated herein by reference in its entirety.

BACKGROUND OF THE INVENTION

1. Technical Field

The present invention relates generally to coating materials for insulated electrical conductors. More particularly, it relates to coating materials for insulated electrical conductors such as ignition wires for spark plugs and other ignition devices.

2. Related Art

Ignition wires for spark plugs commonly include a conductive core, a conductor or semi-conductor coating layer, a release coating, an electrical insulation layer, a strengthening layer to provide enhanced tensile strength and an insulating outer sheath or jacket, and may also include various adhesive and other inner layers. The outer jacket also frequently includes a cosmetic or decorative layer or printed portion on its outer surface. The layers described above may be arranged in different combinations and orders and their particular arrangement will vary depending on the intended application environment and other factors.

In addition to various solid or stranded metal wire configurations, the conductive core may also comprise a wire-wound configuration. Wire-wound cores typically have a braided or otherwise woven insulating core member, such as a rope, to provide tensile strength. This member may have a ferrite or other coating applied that is in turn wrapped with a metal wire and coated with an adhesive and/or conductive or semi-conductive layer. Examples of such wire wound conductive cores are taught by Miyamoto et al. in U.S. Pat. No. 4,435,692 and Coffe et al. in U.S. Pat. No. 4,700,171. Miyamoto et al. teach a wire wound ignition cable in which a resistance wire is wound over a woven member, such as a woven aramid string, which has been coated with a chlorinated polyethylene/ferrite mixture to provide the conductive core. The resistance wire and ferrite coated core are in turn coated by a woven strengthening member and an extruded sheath of a blend of polyethylene and ethylene propylene diene monomer (EPDM). Coffe et al. discloses an ignition cable similar in some respects to that taught by Miyamoto et al. in which a conductive core is formed by dip coating a strengthening member formed from a glass fiber bundle with an insulating layer containing a mixture of EPDM and magnetic particles, such as iron oxide. The coated woven core is then helically wrapped with a resistance wire conductor, such as various Ni alloys. The resistance wire of Coffe et al. is then dip coated with a semi-conductive thermoplastic polymer, such as a silicone or acrylic polymer. The semi-conductive thermoplastic polymer contains carbon particles and release agents which allow subsequently applied insulating layers to be stripped away cleanly. The conductive core of Coffe et al. is coated with an insulating layer formed from EDPM, an optional fiberglass braid layer, and a polymer jacket formed from a mixture of EPDM, ethylene vinyl acetate copolymer, phenolic antioxidant and a metal salt antioxidant. In general, for conductive cores as described in Miyamoto et al. and Coffe et al., a release coating is applied to the exterior of the core or incorporated into a conductive coating in order to promote removal of the insulating layer from the core during the application of terminations or connectors to the ignition wire.

The ignition wire insulation layer may be made from various materials that provide electrical insulation and are resistant to degradation at the elevated operating temperatures of an internal combustion engine. Examples of materials that have been used for the insulating layer in various wire configurations include EPDM and various silicones.

The strengthening layer is typically made from fiberglass and comprises a woven sheath. This layer maybe woven over the insulation layer directly or pre-woven and applied over the insulation layer.

The insulating jacket is typically made of a material that is resistant to high levels of heat, as well as abrasion, because it forms the outer wall of the ignition wire. Various materials have been used for the insulating jacket, such as EPDM, various silicones and other materials, depending on the intended application and other factors. The jacket is typically extruded over the insulating layer. The process of extrusion can alter the thermal, mechanical and/or chemical properties of both the jacket and the underlying insulation layer. As such, the overall appearance of the outer surface of the jacket may be affected, as well as the abrasion resistance of the jacket itself.

As noted above, in many ignition wire applications, it is desirable to apply cosmetic or decorative materials, such as various inks and the like, which are used to print information on the wire such as the manufacturer's name, product numbers, wire sizes, manufacturer's logos or trademarks, performance characteristics, specifications, or other important information, as well as ornamental designs. Being located on the outer surface, such materials are subject to high temperatures, abrasion from dirt and other under-hood sources of abrasion, mechanical stress, chemicals and other agents which promote their degradation.

To improve the mechanical, thermal and chemical properties of the insulated wires, the jacket may include a coating material coated thereon. U.S. Pat. No. 4,000,362 to Kawaguchi et al. discloses an electrical insulated metallic wire comprising a releasing layer coated on the metallic wire with a baked-on insulating layer superposed on the releasing layer. The insulating layer is formed on the releasing layer by coating and baking a silicone-containing insulating varnish having a releasing ability on the releasing layer. The releasing ability of the silicone-containing insulating varnish allows the insulating layer to be easily stripped from the releasing layer. It is believed that the construction of Kawaguchi would not be applicable for the protection of the cosmetic or decorative materials or enhancing the abrasion resistance of the jacket because it is applied over a release coating and is designed to be readily removed from the outer surface of the wire jacket.

Therefore, it is desirable to develop coating compositions which may be applied to ignition wires and are compatible with and provide improved protection, such as improved heat and abrasion resistance, to the outer surface of the wire jacket. Further, it is also desirable to develop coating compositions which may be applied to ignition wires and are compatible with and provide enhanced protection to cosmetic or decorative materials, such as inks, appliques or other like materials, which are applied to the outer surface of the wire jacket.

SUMMARY OF THE INVENTION

It is an object of the present invention to provide an improved coating material composition for application to the outer surface of an insulating jacket of an ignition wire.

In one aspect, the coating material composition produces a transparent coating layer which improves the abrasion resistance of the insulating jacket without adversely affecting the underlying insulation layer or the insulating jacket layer.

In a second aspect of the invention, the coating material composition produces a transparent coating layer which improves the heat resistance of the ignition wire without adversely affecting the underlying insulation layer or the insulating jacket layer.

In a third aspect, the coating material composition produces a transparent coating layer which provides a protective covering for a cosmetic layer that is also applied to the outer surface of the insulating jacket without adversely affecting the cosmetic layer.

In a fourth aspect, the coating material composition produces a transparent coating layer which provides an aesthetically pleasing clear coat coating on the outer surface of the insulating jacket layer.

In a fifth aspect, the coating material has an outer surface to which an external cosmetic layer may also be applied.

The invention is a coating material composition which includes silicone coating material operative to graft a silicone polymer coating on an ignition wire, the ignition wire having an insulated conductor comprising an inner conductive core and an outer insulating jacket layer having an outer surface, on the outer surface of the insulating jacket layer, which includes: a silicone prepolymer; a coupling agent; a catalyst, and a graft initiator. The graft initiator is operative to prepare the outer surface of the insulating jacket to receive by grafting a coating layer comprising the silicone prepolymer and the coupling agent, and the catalyst is operative to promote grafting by polymerization of the coating layer. In a preferred embodiment of the material composition of the invention, the silicone prepolymer includes a methyl siloxane liquid, the coupling agent includes an amino functional silane monomer, the catalyst includes an organic peroxide and the graft initiator includes a metal salt.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
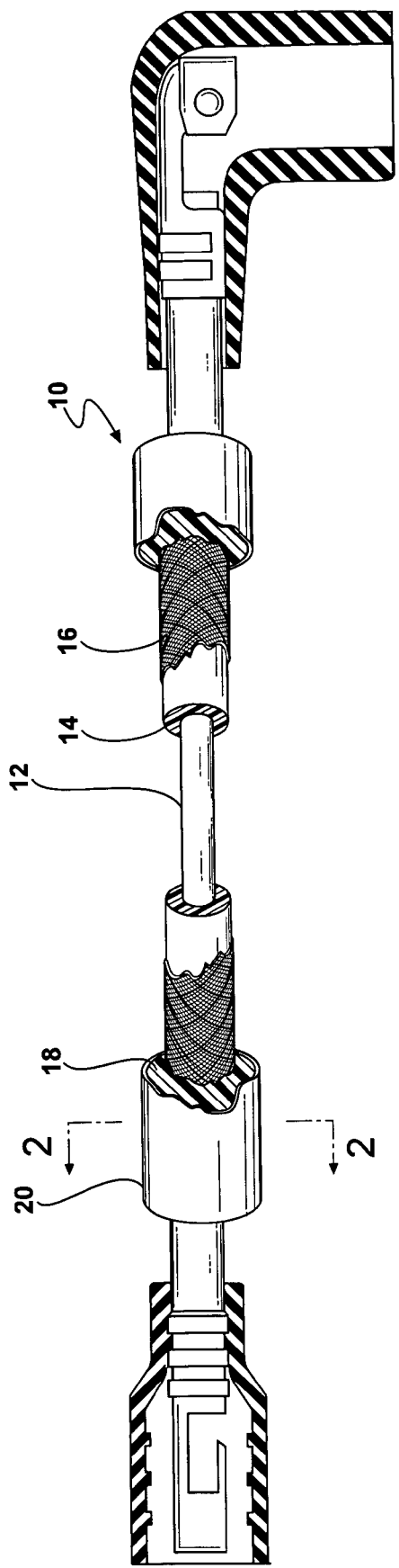
FIG. 1 is a perspective view of an ignition wire having an insulating jacket with the coating material of the present invention.
Figure 2:
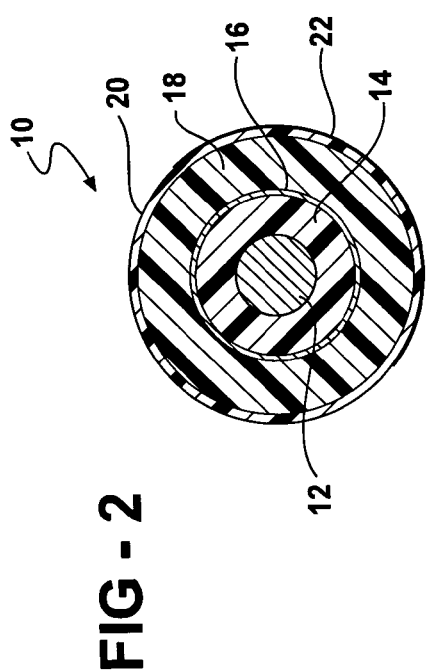
FIG. 2 is a cross-sectional view of the ignition wire of FIG. 1 taken along line 2-2.

In reference to FIGS. 1-2, an ignition wire 10 comprises a conductive core 12 surrounded by an insulation layer 14 and a jacket 18 having an outer surface 20, which includes a cosmetic layer 22, and a silicone-containing coating layer 24 that is grafted, using chemical or physical grafting processes, and bonded thereon to thereby improve the abrasion and heat resistance of the ignition wire 10 without adversely affecting the mechanical, thermal and/or chemical properties of the underlying insulation layer 14, jacket 18 or cosmetic layer. The insulation layer 14 is an insulating material that is extruded over the conductive core 12. A strengthening member, such as fiberglass braid 16, is then applied over the insulation layer 14 for mechanical strength. The jacket 18 is extruded over the braided layer 16 and is composed of an insulating material that improves the resistance of the ignition wire 10 to extreme levels of heat as well as providing additional electrical insulation. The silicone-containing coating material is grafted and bonded to the jacket 18.

The conductive core 12 can be provided as an electrically conductive metal wire or wire strand, a flexible, single, carbon fiber or strand of fibers, a wire-wound bundle of braided or woven fibers having a ferrite or other coating, or any other electrically conductive wire configuration of a type commonly used for ignition wires and/or cables. Preferably, the core 12 is a wire-wound Kevlar core having a ferrite coating with a Cu—Ni alloy (12% Ni/88% Cu by weight) wire wound around it. The Kevlar core may comprise a braided rope or string configuration such as, for example, a Kevlar string having a diameter of about 0.035 inches (Kevlar DT140) with a ferrite coating on its outer surface. A preferred ferrite coating comprises a mixture of Cu—Zn ferrite particles having average particle size of about 200-300 mesh and comprising about 40% by weight in a polymer matrix. While Cu—Zn ferrite was utilized, other ferrites are also believed to be suitable for use, as they all will tend to produce a magnetic field in response to current flow in the wire windings, thereby increasing the inductance and electromagnetic interference suppression of the wire. The polymer matrix may include both conductive and non-conductive polymers that are suitable for use in the ignition wire application environment, including those made from conductive and non-conductive latex materials. An example of a suitable conductive latex is WC 2193 manufactured by Key Polymer. In a preferred configuration, the Cu—Ni alloy wire has a wire diameter of about 0.0035 inches (39 gauge) and is wrapped around the ferrite-coated Kevlar core with a winding density of about 147 windings/inch. The wire wound conductive core 12 may then be coated with a commercially available conductive latex material and a release agent of types well-known in the art, such as conductive latex materials EFTEC WB 2693 manufactured by HB Fuller or WC 2193 manufactured by Key Polymer, and release agent Grafo 1145 (manufactured by Fuchs Lubricants Co.). The diameter of the conductive core 12 is about 0.058 inch (+/−10%) having a resistance of about 170 ohms/ft (+/−10%).

The insulation layer 14 is extruded over the core 12 and provides an insulating layer to electrically isolate and mechanically protect the core 12. The mechanical bond formed by the extrusion process is relatively weak so that the insulation layer 14 can be easily stripped from the conductive core 12. The insulation layer 14 has a thickness of about 0.061 inches (+/−0.005 inches) and is composed of a flexible insulating thermoset polymer material of a type used in ignition wires and/or cables, such as various insulating elastomers, including various silicones, EPDM and other insulating elastomers having suitable mechanical strength, heat resistance, electrical isolation and other characteristics required in ignition applications. Preferably, the insulation layer 14 is composed of silicone or a silicone-containing elastomer substrate. The methods and equipment used to extrude the materials used for insulation layer 14 are well-known. In an exemplary embodiment, insulation layer 14 comprised GS67FM silicone manufactured by Specialty Products and Polymers, Inc.

The fiberglass braiding layer 16 is responsible for providing the ignition wire 10 with mechanical strength. In an exemplary embodiment, the fiberglass braid layer 16 was composed of a natural glass fiber yarn having a standard basket weave of 8.5 ppi. The fiberglass braid 16 may be braided directly over the surface of the insulation layer 14, but may also be applied by inserting the wire containing the insulation layer into a pre-woven sheath. The braided pattern can be a woven pattern, a simple helical pattern, or the like, such as is commonly used in ignition wires and/or cables.

The insulating jacket layer 18, which is extruded over the fiberglass braiding layer 16, is responsible for providing further electrical insulation or isolation and resistance to heat and abrasion of the exterior surface of the ignition wire 10. The jacket 18 is composed of a flexible insulating thermoset polymer material of a type used in ignition wires and/or cables, such as various insulating elastomers, including various silicones and other insulating elastomers having suitable mechanical strength, heat resistance, electrical isolation and other characteristics required in ignition applications. Preferably, insulating jacket layers 18 s made of a silicone compound that functions over the entire temperature range commonly used to test vehicles and their ignition wires and can, for example, withstand elevated temperatures in the range of 425° F. to 600° F. or more, while also retaining flexibility and desirable electrical performance characteristics at temperatures well below −58° F. The insulating jacket layer 18 is preferably slightly thicker than insulation layer 14 and in one embodiment had a thickness of about 0.077 inches (+/−0.005 inches). In an exemplary embodiment, insulating jacket 18 was made by extruding GS810LC silicone manufactured by Specialty Products and Polymers, Inc. Insulating jacket layer 18 may also incorporate a dye or other colorant which may be used to control the color of jacket 18, and in particular, the color of the exterior surface 20 of jacket 18. Table 1 illustrates the dimensions of a number of ignition wires of the present invention having the general construction described above, including a silicone insulation layer and silicone insulating jacket layer.

or other physical characteristics of cosmetic layer 22 may be selected to provide contrast to or otherwise enhance the appearance of the outer surface 20 of insulating jacket 18. Cosmetic or decorative layer 22 can take many forms, including printed information such as the manufacturer's name, product numbers, wire sizes, manufacturer's logos or trademarks, performance characteristics, specifications or other important information, as well as a broad array of ornamental designs. For example, the silicone-containing jacket 18 may include a colorant to produce a dark blue color, while cosmetic layer 22 can be printed with a silver ink to provide contrasting silver-colored lettering on the jacket surface 20.

To provide the ignition wire 10 with improved resistance to abrasion and heat and to help maintain and/or enhance the aesthetic or cosmetic appearance of the jacket surface 20 and any cosmetic or decorative layer 22 that is applied, a coating layer 24 is applied over the jacket surface 20. The coating layer 24 is preferably a relatively thin (i.e., microns thick) layer of a transparent, silicone-based or silicone-containing coating material. In a preferred embodiment, coating layer 24 is between about 5-40 microns thick. Coating layer 24 is grafted and bonded, such as by using chemical grafting processes, to the outer surface 20 of insulating jacket layer 18 with strong covalent chemical bonds. Coating layer 24 is preferably a transparent coating, and even more preferably a clear coating, such that it provides a clear coat finish to the outer surface of the insulating jacket layer. However, it is believed that coating layer 24 may also incorporate various known tints, colorants and the like that may be used to make the layer translucent or even opaque in character, and to provide a wide variety of tints, shades and colors. Coating layer 24 may be formed using any coating material composition that is operative to produce a grafted and bonded coating layer to insulating jacket layer 18. Grafting preferably utilizes chemical grafting processes, but various physical grafting processes have also been suggested for other applications and may be extendable for use in the present invention. When insulating jacket layer 18 comprises a silicone, coating layer 24 also preferably comprises a grafted and bonded silicone.

TABLE 1

| Wire Diameter (mm) | Conductor Type | Core Diameter (inches) | Insulation Layer | | Insulating Jacket Layer | |
|---|---|---|---|---|---|---|
| | | | Outer Diameter (inches) | Wall (inches) | Outer Diameter (inches) | Wall (inches) |
| 5 | wire wound | 0.058 | 0.120 | 0.031 | 0.201 | 0.041 |
| 7 | wire wound | 0.058 | 0.0180 | 0.061 | 0.276 | 0.048 |
| 7 | metallic | 0.056 | 0.180 | 0.062 | 0.276 | 0.048 |
| 7 | conductive carbon/fiberglass | 0.070 | 0.180 | 0.055 | 0.276 | 0.048 |
| 8 | wire wound | 0.058 | 0.205 | 0.074 | 0.315 | 0.055 |
| 8 | conductive carbon/fiberglass | 0.070 | 0.205 | 0.068 | 0.315 | 0.055 |

The ignition wire construction of the present invention is believed to be extendable and applicable to any ignition wire size.

The surface 20 of the jacket 18 can be surface finished in a variety of colors using a variety of different materials, finishes and techniques, such as the printing of various inks, the use of shrink-wrap appliques, embossing and the like, to achieve a desired and enhanced exterior cosmetic or decorative layer 22 appearance for the ignition wire 10. The color A preferred coating layer 24 may be formed from the coating material composition described in more detail in Example 1 below.

EXAMPLE 1

A preferred transparent coating layer 24 may be made from a coating material composition which includes between 35 and 45 parts by weight of a silicone prepolymer, less than 1 part by weight of a silane coupling agent, less than 1 part by weight of a catalyst, less than 1 part by weight of a graft initiator and the balance a reactive solvent.

The silicone prepolymer is preferably an RTV silicone that is adapted upon curing to provide a silicone polymer coating layer 24. The coupling agent is preferably a silane coupling a gent, and more preferably an amino-functional silane coupling agent. The catalyst is preferably operative to promote grafting by polymerization of the silicone polymer coating 24 to the outer surface of insulating jacket layer 18. The graft initiator is operative to prepare the outer surface of the insulating jacket layer to receive by grafting a coating layer comprising the silicone prepolymer and said coupling agent. It is believed that the graft initiator is adapted to produce graft receptor sites on the insulating jacket layer by alteration of the chemical bonds of the silicone material of insulating jacket layer 18 at its outer surface 20.

A preferred coating material composition includes:

---

40.00 parts by weight of silicone prepolymer, preferably DC 1-2620 (manufactured by Dow Corning) which is a one part RTV methoxy siloxane silicone resin solution comprising, by weight, >60% octamethyltrisiloxane, 15.0-40.0% dimethyl methylphenylmethoxy siloxane, 3.0-7.0% methyltrimethoxysilane and 3.0-7.0% toluene and is described as being operative to produce elastoplastic conformal coatings;

60.00 parts by weight of a reactive solvent DC OS-30 (manufactured by Dow Corning) which is a methyl siloxane liquid comprising, by weight >60% decamethyltetrasiloxane;

0.25 parts by weight of monomer silane Silquest A-1100 (manufactured by GE Silicones) which is gamma aminopropyltriethoxysilane as a coupling agent;

0.10 parts by weight of methyl ethyl ketone (MEK) peroxide (0.01% in MEK) organic catalyst in plasticizers comprising, by weight, about 58.0% 2,2,4 trimethyl-1,3-pentanediol diisobutyrate, 32-34% methyl ethyl ketone peroxide, 6.0% hexylene glycol, 1-2% methyl ethyl ketone, 0.7% hydrogen peroxide and 0.7% water; and 0.10 parts by weight of silver perchlorate (0.01% in toluene).

---

This is further shown in Table 2 below, as well as by weight percent of the various constituents:

TABLE 2

| Coating Material Composition Constituent | Parts | Percent |
|---|---|---|
| Dow Corning OS-30 | 60.00000 | 59.73121 |
| Dow Corning 1-2620 | 40.00000 | 39.82081 |
| Lupersol DDM-9 MEKP | 0.00001 | 0.00001 |
| Methyl Ethyl Ketone | 0.09999 | 0.09954 |
| Silquest A-1100 | 0.25000 | 0.24888 |
| Silver Perchlorate | 0.00001 | 0.00001 |
| Toluene | 0.09999 | 0.09954 |
| Total | 100.45000 | 100.00000 |

The coating material composition used for coating layer 24 is prepared by stirring each component, in the preferred concentration ratio (in parts by weight) using the method described below.

First, the method included a step of forming a graft precursor polymer. To form a graft precursor polymer, silane coupling agent is stirred into a portion of the silicone prepolymer. These constituents were thoroughly blended together by stirring using a mixer to achieve a homogenous batch. After blending, mixture was allowed to stand for a period of time sufficient for the silane coupling agent to form chemical bonds with or graft to the silicone prepolymer, thereby forming a graft precursor polymer. In this case where the silicone prepolymer was a one part RTV methoxy siloxane silicone resin solution of DC 1-2620, and the coupling agent was a monomer silane of gamma aminopropyltriethoxysilane in the form of Silquest A-1100, a sufficient time was about 24 hours. It is believed that the silane monomer grafts to the silicone prepolymer and forms a comb-like molecular structure on the polymer which also functions as graft initiator sites for a subsequent grafting reaction of the graft precursor polymer to the outer surface of the insulating jacket layer. By use of a portion of the silicone prepolymer, it is meant that use of roughly an equal portion (by volume or by weight) of the prepolymer and the coupling agent are mixed to form the graft precursor polymer is preferred. While these quantities are preferred, either a lesser quantity of prepolymer, or a greater quantity of prepolymer may be used to make graft precursor polymer.

Secondly, following the step of forming the graft precursor polymer, the method included a step of mixing the balance of the silicone prepolymer and the reactive solvent for a time sufficient to thoroughly mix them. In one embodiment, the mixing time was about 5 minutes. This will of course vary as a function of the mixing speed and the like.

Thirdly, following the mixing together of the silicone prepolymer, silane monomer and reactive solvent, the graft polymerization catalyst in the form of MEK peroxide was added and again thoroughly mixed together with these components by stirring in a mixer for between about 10 minutes.

Fourthly, the graft precursor polymer, which had been allowed to set for a sufficient time as described above was added and mixed together into the batch for about 15 minutes.

Fifthly, the graft initiator in the form of silver perchlorate in toluene was added and again thoroughly mixed together with the other components by stirring in a mixer for about 30 minutes.

The coating material composition was then applied by dip coating then and chemically bonded to the insulating jacket layer 12 by chemical grafting or graft polymerization. While dip coating was employed, spray coating and other known coating methods may be used. By chemical grafting, it is meant that some degree of cross-linking and covalent bonding occurs between the coating material composition of coating layer 24 and the outer surface 20 of insulating jacket layer 18.

Specifically, insulating jacket layer 18 of wire 10 was dipped into a supply of the coating material composition and then partially cured in an oven operated at a temperature of between 650-800° F. or about 0.5 minutes or less. The ignition wire 10 was then sent through a water bath to cool back down to room temperature. Since the completion of the graft and/or curing of the silicone prepolymer process takes about 72 hours to complete a silicone-based lubricant may be applied to the coated layer 16 surface to prevent the ignition wire from sticking to other surfaces until the curing/grafting is complete. In this way, ignition wire 10 can be further handled or otherwise used before the silicone polymer coating layer 24 is completely cured.

Unlike mechanical bonds formed between core 12 and insulation layer 14, as well as between insulation layer 14 or, when utilized, strengthening layer 16 and insulating jacket layer 18, the strong chemical bonds formed between the insulating jacket layer 18 and coating layer 24 by grafting greatly contributes to improved resistance of the insulating jacket layer 18 to abrasion, as well as improved heat resistance of the ignition wire 10, thereby significantly improving the usable life of the ignition wire. Since the cured coating material composition of coating layer 24 is preferably transparent, the outer surface 20 of insulating jacket layer 18 can be cosmetically enhanced prior to grafting by the addition of cosmetic layer 22, and, unlike the use of extrusion processes to add a protective layer such as coating layer 18, the grafting process of the present invention does not change the cosmetic appearance of the outer surface 20 of insulating jacket layer 18, or cause the removal or distortion of, or otherwise undesirably affect, cosmetic layer 22. These advantages are obtained using the insulating jacket layer 18 and the specific cured coating material composition of coating layer 24 of the present invention without adversely affecting the mechanical, thermal and/or chemical properties of the insulating jacket layer 18, the underlying insulation layer 14, or cosmetic layer 22. Coating layer 24 also provides an aesthetically desirable finish to the exterior of ignition wire 10. This aesthetically pleasing appearance is analogous in this regard to the application of a clear-coat layer applied to the exterior of painted or otherwise colored surfaces, such as are widely used to enhance the exterior appearance of automobiles, various watercraft, recreational vehicles and other items. Coating layer 24 may be applied to all of the exterior surface 20 of ignition wire 10, or only a portion or portions thereof. Preferably, coating layer 24 will be applied to the entire outer surface 20 of ignition wire 10 so as to maximize the protections afforded to this surface, as described herein. It is preferred that coating layer 24 is transparent, such that an underlying cosmetic or decorative layer 22 is visible through coating layer 24. It is further preferred that in addition to being transparent, coating layer is substantially clear or uncolored to provide a clear-coat over outer surface 20 of insulating jacket layer 18. However, it will be understood that coating layer 24 may also incorporate all manner of colorants, tints and the like so as to color or shade this layer, and the same may be included in varying concentrations and colors such that this layer may be translucent or still further substantially or completely opaque. Such is the range of appearances that may be achieved in chemically grafted and bonded coating layer 24.

An external cosmetic or decorative layer 26 like unto that described above for cosmetic layer 22 may also be applied to the outer surface of transparent coating layer 24. While some of the protection benefits described are believed to be reduced in such a configuration as compared to that of cosmetic layer 22, some applications may require or make highly desirable the application of a cosmetic layer 26 to the exterior surface of wire 10 and coating layer 24. It will also be appreciated that cosmetic layer 22 and external cosmetic layer 26 may each be implemented separately or that they may be implemented together and in various combinations.

It will thus be apparent that there has been provided in accordance with the present invention an ignition wire for spark plugs and similar ignition devices and a method for manufacturing the same that achieves the aims and advantages specified herein. Further, the present invention also describes a coating material composition for application to ignition wires for spark plugs and similar ignition devices and a method of making the same. It will, of course, be understood that the foregoing description is of a preferred exemplary embodiment of the invention and that the invention is not limited to the specific embodiment shown and/or described. For example, the grafting technique may include irradiation or compressive bonding processes to fully cure and graft the coating layer 20 to the jacket 18. It has also been suggested that these and other techniques, such as those described in U.S. Pat. No. 6,630,644, which is hereby incorporated herein by reference in its entirety, may be employed to promote grafting and bonding of a coating layer largely by utilization of physical processes as compared to chemical grafting processes. Such grafting techniques may also be utilized in conjunction with the present invention. Still further, the present invention is also believed to be extendable to insulating jacket materials other than silicone jacket materials, such as those made from EPDM or various chlorinated polyethylene elastomers (CPE), as well as copolymers of these materials and various silicones, depending on the application requirements for ignition wire 10.

Obviously, many modifications and variations of the present invention are possible in light of the above teachings. It is, therefore, to be understood that within the scope of the appended claims, the invention may be practiced otherwise than as specifically described.

What is claimed is:

1. A silicone coating material operative to graft a silicone polymer coating on an ignition wire, the ignition wire having an insulated conductor comprising an inner conductive core and an outer insulating jacket layer having an outer surface, on the outer surface of the insulating jacket layer, comprising:
   a silicone prepolymer;
   a coupling agent;
   a catalyst, and
   a graft initiator, wherein the graft initiator is operative to prepare the outer surface of the insulating jacket to receive by grafting a coating layer comprising said silicone prepolymer and said coupling agent, and wherein said catalyst is operative to promote grafting by polymerization of the coating layer;
   wherein said silicone prepolymer comprises an RTV silicone resin solution, said RTV silicone resin solution comprises a methyl siloxane resin solution, and said methyl siloxane resin solution comprises, by weight, >60% octamethyltrisiloxane, 15.0-40.0% dimethyl methylphenylmethoxy siloxane, 3.0-7.0% methyltrimethoxysilane and 3.0-7.0% toluene.

2. The silicone coating material of claim 1, further comprising a reactive solvent.

3. The coating material of claim 2, wherein said reactive solvent comprises a methyl siloxane liquid.

4. The coating material of claim 1, wherein said coupling agent is a silane monomer.

5. The coating material of claim 4, wherein the silane monomer comprises an amino-functional silane monomer.

6. The coating material of claim 5, wherein the amino functional silane monomer comprises gamma aminopropyltriethoxysilane.

7. The coating material of claim 1, wherein said catalyst comprises an organic peroxide.

8. The coating material of claim 1, wherein the organic peroxide comprises methyl ethyl ketone peroxide.

9. The coating material of claim 1, wherein said graft initiator comprises a metal salt.

10. The coating material of claim 9, wherein the graft initiator comprises silver perchlorate.

* * * * *

UNITED STATES PATENT AND TRADEMARK OFFICE
CERTIFICATE OF CORRECTION

PATENT NO. : 7,309,745 B2
APPLICATION NO. : 11/174826
DATED : December 18, 2007
INVENTOR(S) : Mohan Sanduja et al.

It is certified that error appears in the above-identified patent and that said Letters Patent is hereby corrected as shown below:

| | |
|---|---|
| Column 4, Line 50 | Replace "inch" with -- inches -- |
| Column 5, Line 24 | Replace "jacket layers" with -- jacket layer -- |
| Column 5, Line 24 | Replace "18 s made" with -- 18 is made -- |
| Column 8, Line 50 | Replace "or about" with -- for about -- |
| Column 9, Line 32 | After "coating layer" insert -- 24 -- |

Signed and Sealed this

Twentieth Day of May, 2008

JON W. DUDAS
*Director of the United States Patent and Trademark Office*